US011704834B2

United States Patent
Sours et al.

(10) Patent No.: US 11,704,834 B2
(45) Date of Patent: Jul. 18, 2023

(54) CONVOLUTION-BASED CAMERA AND DISPLAY CALIBRATION

(71) Applicant: Magic Leap, Inc., Plantation, FL (US)

(72) Inventors: Michael Alexander Sours, Plantation, FL (US); Zhiheng Jia, Weston, FL (US); Hans Brandon Wach, Longmont, CO (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/308,918

(22) Filed: May 5, 2021

(65) Prior Publication Data

US 2021/0350574 A1    Nov. 11, 2021

Related U.S. Application Data

(60) Provisional application No. 63/020,787, filed on May 6, 2020.

(51) Int. Cl.
*G09G 5/00* (2006.01)
*G06T 7/80* (2017.01)

(52) U.S. Cl.
CPC ............... *G06T 7/80* (2017.01); *G09G 5/003* (2013.01); *G09G 2320/0693* (2013.01)

(58) Field of Classification Search
None
See application file for complete search history.

(56) References Cited

U.S. PATENT DOCUMENTS

| 9,172,913 | B1 | 10/2015 | Johnston et al. |
| 2010/0245591 | A1* | 9/2010 | Tan ...................... H04N 17/045 |
| | | | 348/184 |
| 2020/0043201 | A1 | 2/2020 | Tanaka et al. |
| 2020/0320721 | A1* | 10/2020 | Holladay ............... A61B 6/481 |
| 2021/0116864 | A1* | 4/2021 | Hornstein ................ G06T 7/80 |
| 2021/0256729 | A1* | 8/2021 | Colmenares ............. G06T 7/33 |
| 2021/0306389 | A1* | 9/2021 | Kulbida .............. H04L 65/4015 |

OTHER PUBLICATIONS

Application No. PCT/US2021/030962, International Search Report and Written Opinion, dated Aug. 25, 2021, 7 pages.
Application No. PCT/US2021/030962, "International Preliminary Report on Patentability", dated Nov. 17, 2022, 6 pages.

* cited by examiner

*Primary Examiner* — Andre L Matthews
(74) *Attorney, Agent, or Firm* — Kilpatrick Townsend & Stockton LLP

(57) ABSTRACT

Techniques for calibrating cameras and displays are disclosed. An image of a target is captured using a camera. The target includes a tessellation having a repeated structure of tiles. The target further includes unique patterns superimposed onto the tessellation. Matrices are formed based on pixel intensities within the captured image. Each of the matrices includes values each corresponding to the pixel intensities within one of the tiles. The matrices are convolved with kernels to generate intensity maps. Each of the kernels is generated based on a corresponding unique pattern of the unique patterns. An extrema value is identified in each of the intensity maps. A location of each of the unique patterns within the image is determined based on the extrema value for each of the intensity maps. A device calibration is performed using the location of each of the unique patterns.

18 Claims, 13 Drawing Sheets

CONVOLUTION-BASED CAMERA AND DISPLAY CALIBRATION

CROSS-REFERENCES TO RELATED APPLICATIONS

This application claims the benefit of priority to U.S. Provisional Patent Application No. 63/020,787, filed May 6, 2020, entitled "CONVOLUTION-BASED CAMERA AND DISPLAY CALIBRATION," the entire content of which is incorporated herein by reference for all purposes.

BACKGROUND OF THE INVENTION

A camera is an input device that is often employed to capture images or video. The data captured by the camera is used in a variety of different purposes and contexts. For example, a wearable device may include one or more onboard cameras to provide image data for the surrounding environment around the user of that wearable device. One example is a stereoscopic wearable glasses that features two forward-oriented cameras configured to capture images for an augmented reality (AR) presentation to the user through stereoscopic displays. The wearable glasses may also include backwards-oriented cameras to capture images of the user's eyes.

Camera calibration is often performed to ensure the precision and accuracy of the camera, as well as the information extracted from the image data captured by the camera. The camera calibration process determines the true parameters of a camera device that produces an image, which allows for determination of calibration data of the camera such as intrinsic parameters and extrinsic parameters. The intrinsic parameters include, but are not limited to, focal point, focal length, principal point, and distortion coefficients. The extrinsic parameters include, but are not limited to, positional relationships between multiple cameras, and translational and rotational offsets between sensors.

A display, also referred to as a display device, is an output device that presents information in visual form. Displays such as those used in smart phones, computers, and tablets can exhibit a significant amount of variability in their color response, tone response, etc., due to the characteristics of the optical components. Similar to camera calibration, display calibration can be used to determine various parameters associated with the display. Upon determining these parameters, the display can be adjusted to produce desired luminance or brightness levels, colors, tones, pixel locations, among other possibilities.

In some instances, a display calibration can include a geometric aspect. For example, in binocular displays such as those found in AR displays, three-dimensional (3D) images may be displayed with a perceived depth texture. Due to eyepiece distortion, misaligned light-emitting diode (LED) channels, and/or misaligned eyepieces, etc., the coordinate system that maps each display pixel to light coming from a particular direction in 3D space perceived by the user may not be initially known. Geometry display calibration can be employed to determine, by displaying targets (such as a checkerboard or a series of dots), the spacing in pixels of each feature.

Both cameras and displays are often calibrated through the use of two-dimensional (2D) patterns referred to as markers or targets. Commonly used targets include ArUco targets and their derivatives, namely ChArUco targets. These targets are captured using cameras via traditional computer vision methods in well-lit environments. Captured images can be analyzed to identify 2D points along the targets, which can then be used to perform six degrees of freedom (6DOF) pose estimation. For example, fiducial-based SLAM reconstructs the world by first placing a small number of fixed and unique patterns in the world. The pose of a calibrated camera can be estimated once at least one such target is detected.

SUMMARY OF THE INVENTION

The present disclosure relates generally to techniques for improving the performance of cameras and display devices. More particularly, embodiments of the present disclosure provide techniques for the capture and processing of an image containing a multi-pattern target for the calibration of either the device capturing the image or the device displaying the target contained in the captured image. Although the present disclosure is often described in reference to an augmented reality (AR) device, the disclosure is applicable to a variety of applications in computer vision and display technologies.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method for performing a device calibration, the method comprising: capturing an image of a target using a camera, the target including a tessellation having a repeated structure of tiles, the target further including one or more unique patterns superimposed onto the tessellation; forming one or more matrices based on pixel intensities of the image, wherein each of the one or more matrices includes a plurality of values each corresponding to the pixel intensities within one of the tiles; convolving the one or more matrices with one or more kernels to generate one or more intensity maps, wherein each of the one or more kernels is generated based on a corresponding unique pattern of the one or more unique patterns; identifying an extrema value in each of the one or more intensity maps; determining a location of each of the one or more unique patterns within the image based on the extrema value for each of the one or more intensity maps; and performing the device calibration using the location of each of the one or more unique patterns.

Example 2 is the method of example(s) 1, wherein performing the device calibration includes: calibrating the camera using the location of each of the one or more unique patterns.

Example 3 is the method of example(s) 1-2, further comprising: rendering the target on a display.

Example 4 is the method of example(s) 3, wherein performing the device calibration includes: calibrating the display using the location of each of the one or more unique patterns.

Example 5 is the method of example(s) 1-4, further comprising: dividing the image into a plurality of image regions, wherein a matrix of the one or more matrices is formed for each of the plurality of image regions.

Example 6 is the method of example(s) 1-5, wherein forming the one or more matrices includes: for each of the one or more matrices, calculating each of the plurality of values by averaging the pixel intensities within a corresponding tile of the tiles.

Example 7 is the method of example(s) 1-6, wherein each of the one or more kernels is generated based on the corresponding unique pattern of the one or more unique patterns being superimposed onto the tessellation.

Example 8 is a non-transitory computer-readable medium comprising instructions that, when executed by one or more processors, cause the one or more processors to perform operations comprising: capturing an image of a target using a camera, the target including a tessellation having a repeated structure of tiles, the target further including one or more unique patterns superimposed onto the tessellation; forming one or more matrices based on pixel intensities of the image, wherein each of the one or more matrices includes a plurality of values each corresponding to the pixel intensities within one of the tiles; convolving the one or more matrices with one or more kernels to generate one or more intensity maps, wherein each of the one or more kernels is generated based on a corresponding unique pattern of the one or more unique patterns; identifying an extrema value in each of the one or more intensity maps; determining a location of each of the one or more unique patterns within the image based on the extrema value for each of the one or more intensity maps; and performing a device calibration using the location of each of the one or more unique patterns.

Example 9 is the non-transitory computer-readable medium of example(s) 8, wherein performing the device calibration includes: calibrating the camera using the location of each of the one or more unique patterns.

Example 10 is the non-transitory computer-readable medium of example(s) 8-9, wherein the operations further comprise: rendering the target on a display.

Example 11 is the non-transitory computer-readable medium of example(s) 10, wherein performing the device calibration includes: calibrating the display using the location of each of the one or more unique patterns.

Example 12 is the non-transitory computer-readable medium of example(s) 8-11, wherein the operations further comprise: dividing the image into a plurality of image regions, wherein a matrix of the one or more matrices is formed for each of the plurality of image regions.

Example 13 is the non-transitory computer-readable medium of example(s) 8-12, wherein forming the one or more matrices includes: for each of the one or more matrices, calculating each of the plurality of values by averaging the pixel intensities within a corresponding tile of the tiles.

Example 14 is the non-transitory computer-readable medium of example(s) 8-13, wherein each of the one or more kernels is generated based on the corresponding unique pattern of the one or more unique patterns being superimposed onto the tessellation.

Example 15 is a system comprising: one or more processors; and a non-transitory computer-readable medium comprising instructions that, when executed by the one or more processors, cause the one or more processors to perform operations comprising: capturing an image of a target using a camera, the target including a tessellation having a repeated structure of tiles, the target further including one or more unique patterns superimposed onto the tessellation; forming one or more matrices based on pixel intensities of the image, wherein each of the one or more matrices includes a plurality of values each corresponding to the pixel intensities within one of the tiles; convolving the one or more matrices with one or more kernels to generate one or more intensity maps, wherein each of the one or more kernels is generated based on a corresponding unique pattern of the one or more unique patterns; identifying an extrema value in each of the one or more intensity maps; determining a location of each of the one or more unique patterns within the image based on the extrema value for each of the one or more intensity maps; and performing a device calibration using the location of each of the one or more unique patterns.

Example 16 is the system of example(s) 15, wherein performing the device calibration includes: calibrating the camera using the location of each of the one or more unique patterns.

Example 17 is the system of example(s) 15-16, wherein the operations further comprise: rendering the target on a display.

Example 18 is the system of example(s) 17, wherein performing the device calibration includes: calibrating the display using the location of each of the one or more unique patterns.

Example 19 is the system of example(s) 15-18, wherein the operations further comprise: dividing the image into a plurality of image regions, wherein a matrix of the one or more matrices is formed for each of the plurality of image regions.

Example 20 is the system of example(s) 15-19, wherein forming the one or more matrices includes: for each of the one or more matrices, calculating each of the plurality of values by averaging the pixel intensities within a corresponding tile of the tiles.

Numerous benefits are achieved by way of the present disclosure over conventional techniques. For example, embodiments allow for accurate device calibration even when only a portion of a target is detected by a camera. Additionally, embodiments allow for much finer spacing in the target compared to other targets such as ChArUco, allowing for smaller targets and more identifiable points on the target. Furthermore, embodiments allow for a reduction in cycle time by dividing the image into image regions and processing each of the regions simultaneously using different processing cores.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF SPECIFIC EMBODIMENTS

Figure 1B:
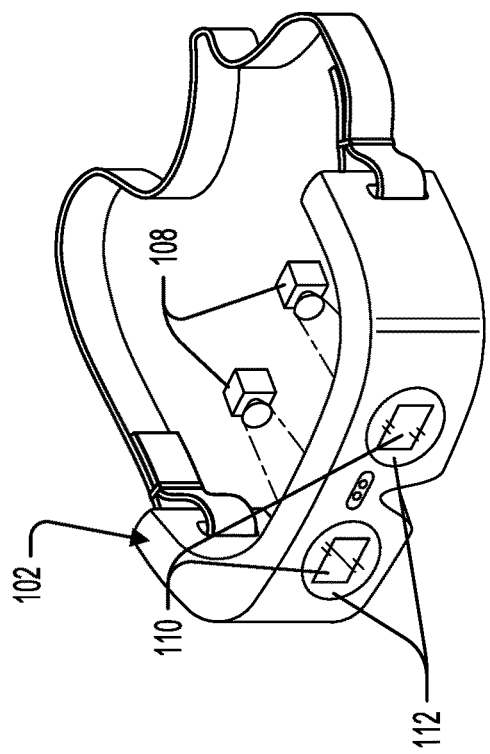
FIG. 1B illustrates an example display calibration scheme.

Embodiments of the present disclosure provide techniques for calibrating cameras and displays using two-dimensional (2D) patterns referred to as targets. In some embodiments described herein, a target is provided that includes a tessellation having a repeated structure of tiles. Each of the tiles may have the same shape, such as a square, rectangle, triangle, hexagon, etc., or several different shapes may be used for the tiles in a single tessellation or target. The target further includes one or more unique patterns that are superimposed onto the tessellation. These unique patterns may be placed at various known locations along the tessellation so that there is a high likelihood that at least one unique pattern is captured in the image.

In some implementations, a kernel is generated for each of the unique patterns that allows extraction of the pattern's location within the image. Each kernel is a matrix whose values are determined based on the detected or expected pixel intensities of the unique pattern superimposed onto the tessellation. For example, when determining the kernel, an optimization routine may be performed to account for the expected lighting and other image effects. The kernels may be predetermined and stored in a memory for retrieval during the calibration process.

When calibrating a camera using the described embodiments, the camera captures an image at least partially containing a target. The target may be presented in a number of ways, such as displayed on a screen, displayed by a projector, printed on an object (e.g., printed on a piece of paper), among other possibilities. The image captured by the camera may be analyzed to identify tiles of a tessellation on the target. The pixel intensities in the image may be averaged for each of the tiles. The averaged intensities may be used to form a matrix representing the tiles.

Next, each of the kernels may be convolved with the matrix representing the tiles to generate one or more intensity maps. In some instances, the image may be divided into multiple image regions. Each image region may be analyzed to form a matrix with average pixel intensities. Each kernel may then be convolved with the corresponding matrix that is expected to include the corresponding unique pattern. The one or more intensity maps may be analyzed to identify an extrema value, such as a maximum or minimum value. The identified extrema values are used to locate the unique patterns in the captured image. Once the unique patterns are located, the camera may be calibrated based on the determined locations of the unique patterns.

When calibrating a display using the described embodiments, the display renders the target having the described tessellation and unique patterns. In some instances, the display is a wearable headset having optical waveguides configured to project light toward a user side so as to cause digital content to be perceived. A calibrated camera is caused to capture an image at least partially containing the target being rendered by the display, and the above-described steps are performed to locate the unique patterns within the captured image.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1A:
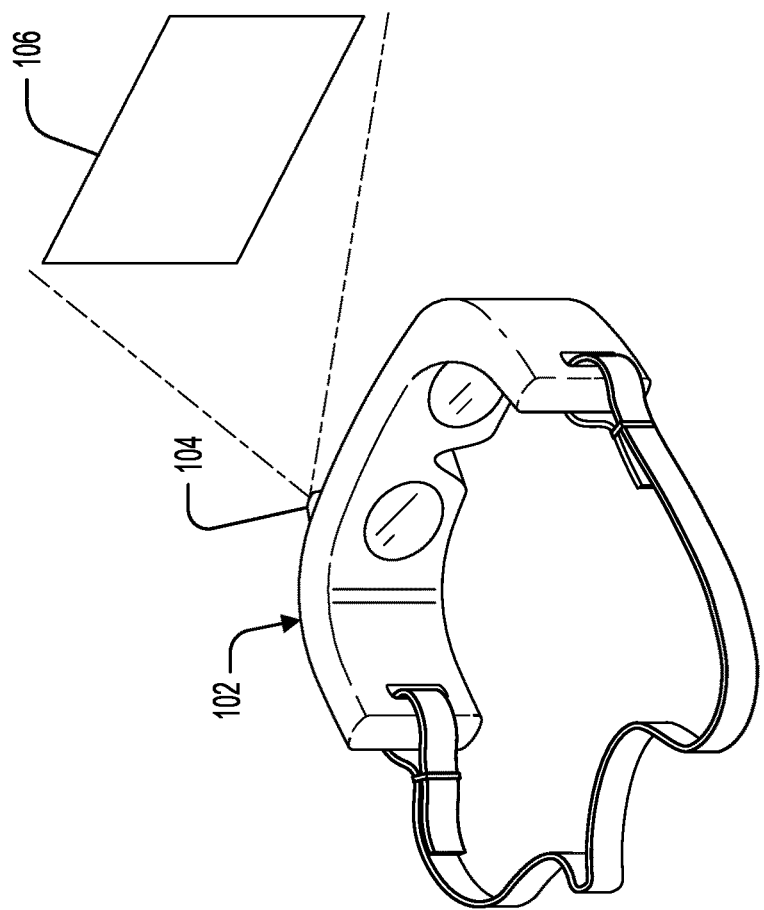
FIG. 1A illustrates an example camera calibration scheme.

FIG. 1A illustrates an example camera calibration scheme, according to some embodiments of the present disclosure. In the illustrated example, a camera 104 captures an image of a target 106, which may be rendered on a display or presented in a number of ways, such as printed on an object. While camera 104 is depicted as being a component of a wearable device 102, camera 104 may be a standalone device or may be a component of any type of system that incorporates image detection, such as a portable electronic device (e.g., smart phone, tablet, watch, etc.), a computer, a smart device, an appliance, a vehicle, among other possibilities. After camera 104 captures the image of target 106, the image is analyzed using known information about target 106 to perform the calibration, as described herein.

FIG. 1B illustrates an example display calibration scheme, according to some embodiments of the present disclosure. In the illustrated example, targets 110 are rendered on displays 112 of wearable device 102, and one or more cameras 108 capture images of targets 110 while being displayed. Targets 110 may be similar to each other or be display specific. While displays 112 are depicted as being a component of wearable device 102 having optical waveguides configured to project light toward a user side, a display 112 may be a standalone device or may be a component of any type of system that incorporates a display, such as a portable electronic device (e.g., smart phone, tablet, watch, etc.), a projector, a television, a computer, among other possibilities. After cameras 108 capture the images of targets 110, the images are analyzed using known information about targets 110 to perform the calibration, as described herein.

Figure 2:
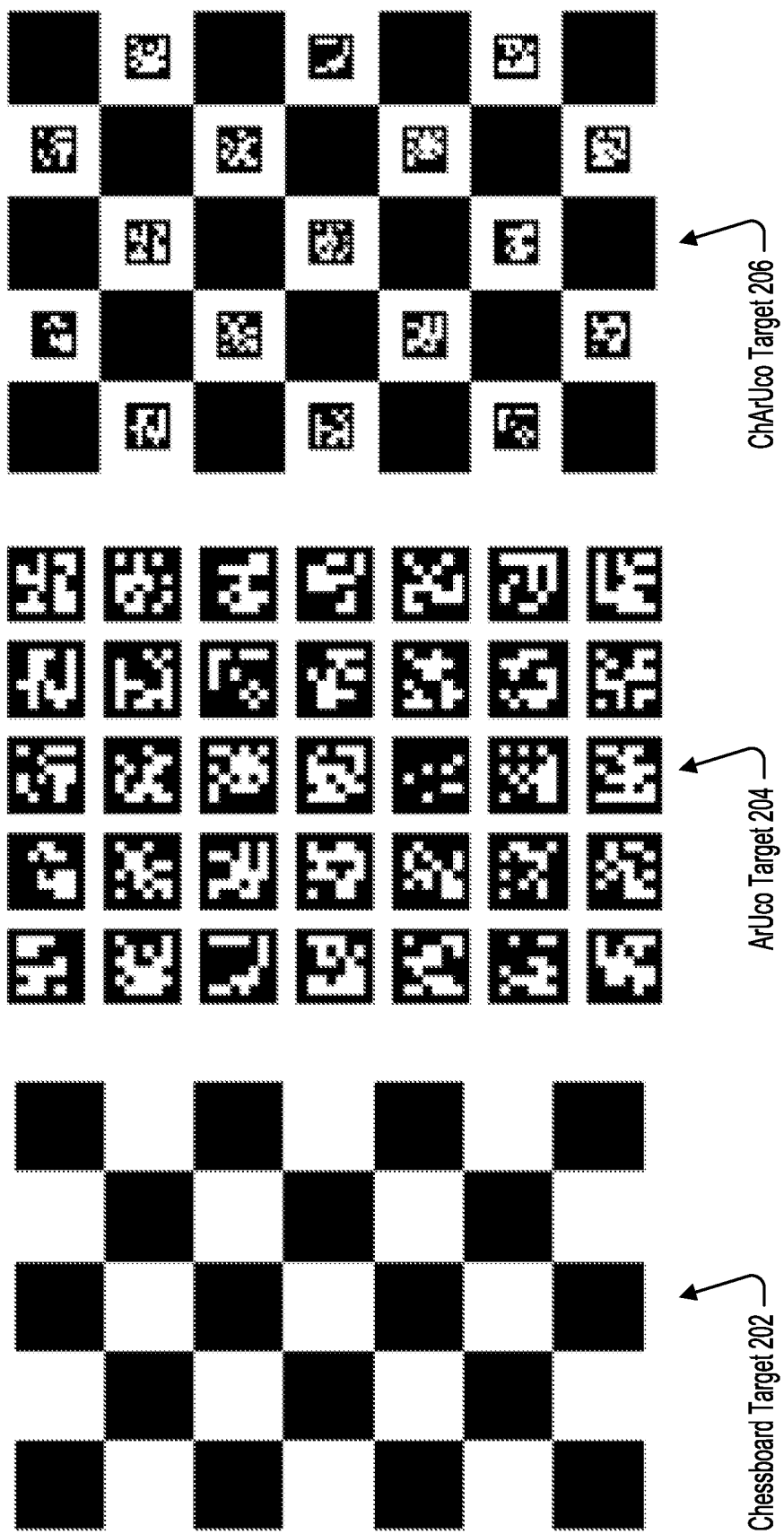
FIG. 2 illustrates various example targets.

FIG. 2 illustrates various example targets, including a chessboard target 202, an ArUco target 204, and a ChArUco target 206. One advantage of chessboard target 202 is that each corner and intersection point of the chessboard is well defined. However, finding a chessboard can be difficult as it has to be completely visible and partial occlusions may disrupt the calibration. ArUco target 204 resolves some of these shortcomings. ArUco target 204 includes various markers that are distinguishable and have known relative positions, making pose estimation much more versatile as only some markers are needed and partial occlusions are allowable. However, ArUco target 204 suffers from accuracy issues as the corner positions are less resolvable than chessboard target 202. ChArUco target 206 attempts to combine the benefits of chessboard target 202 and ArUco target 204 by combining a chessboard with ArUco markers embedded inside the white squares. Detection of the ArUco markers is used to interpolate the position of the chessboard corners so that it has the versatility of the ArUco board, and since interpolated corners are part of the chessboard, they are very accurate in terms of subpixel accuracy.

Figure 3A:
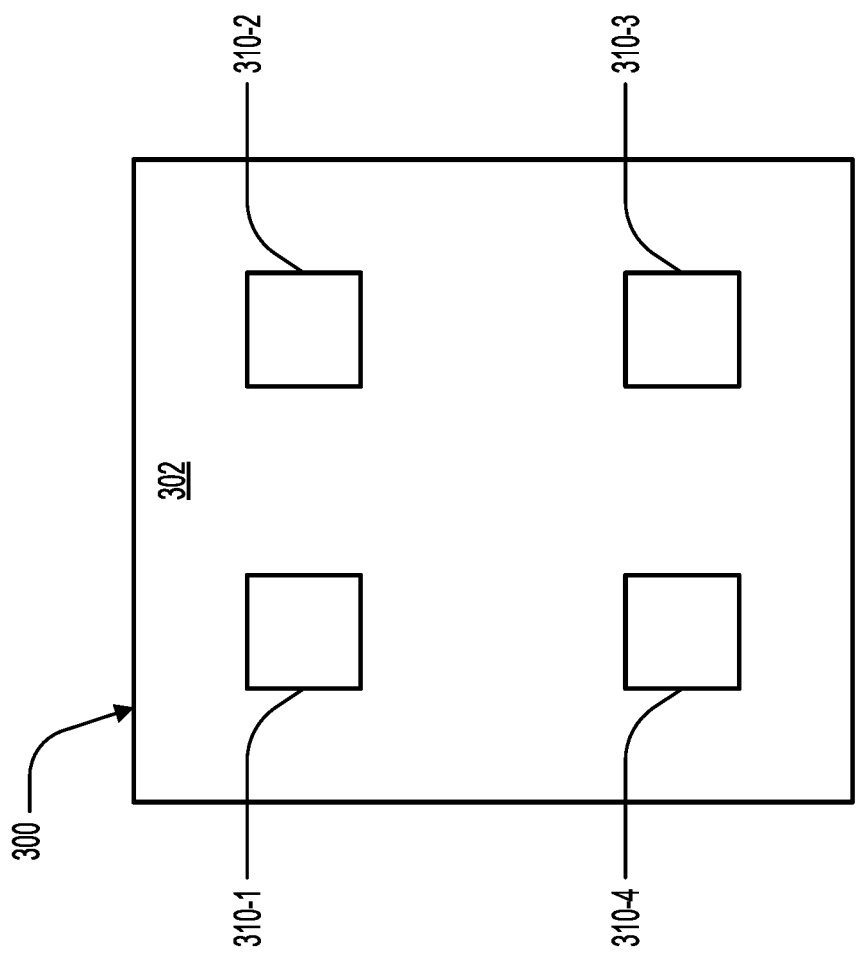
FIG. 3A illustrates an example of a multi-pattern target.

FIG. 3A illustrates an example of a multi-pattern target 300, according to some embodiments of the present disclosure. Multi-pattern target 300 includes a tessellation 302 having a repeated structure of tiles, and a set of patterns 310 superimposed onto tessellation 302. Each pattern 310 may be unique or may be similar to one of the other patterns. In an example in which each pattern 310 is unique, pattern 310-1 may be a first pattern, pattern 310-2 may be a second pattern (different from the first pattern), pattern 310-3 may be a third pattern (different from the first and second patterns), and pattern 310-4 may be a fourth pattern (different from the first, second, and third patterns). In another example in which multi-pattern target 300 includes two unique patterns, patterns 310-1 and 310-3 may be a first pattern and patterns 310-2 and 310-4 may be a second pattern (different from the first pattern).

Patterns 310 may be positioned at different locations within multi-pattern target 300 so that there is a high likelihood of detection of at last one of the patterns by a camera. Patterns 310 may also be positioned in a manner such that an image of multi-pattern target 300 may be divided into different image regions that are processed separately (and possibly simultaneously), with each image region containing at least one of the patterns. In the illustrated example, patterns 310 are spaced relatively evenly within different quadrants of multi-pattern target 300 such that an image of multi-pattern target 300 may be divided into four image regions by splitting the image vertically along a center line and horizontally along a middle line.

Figure 3B:
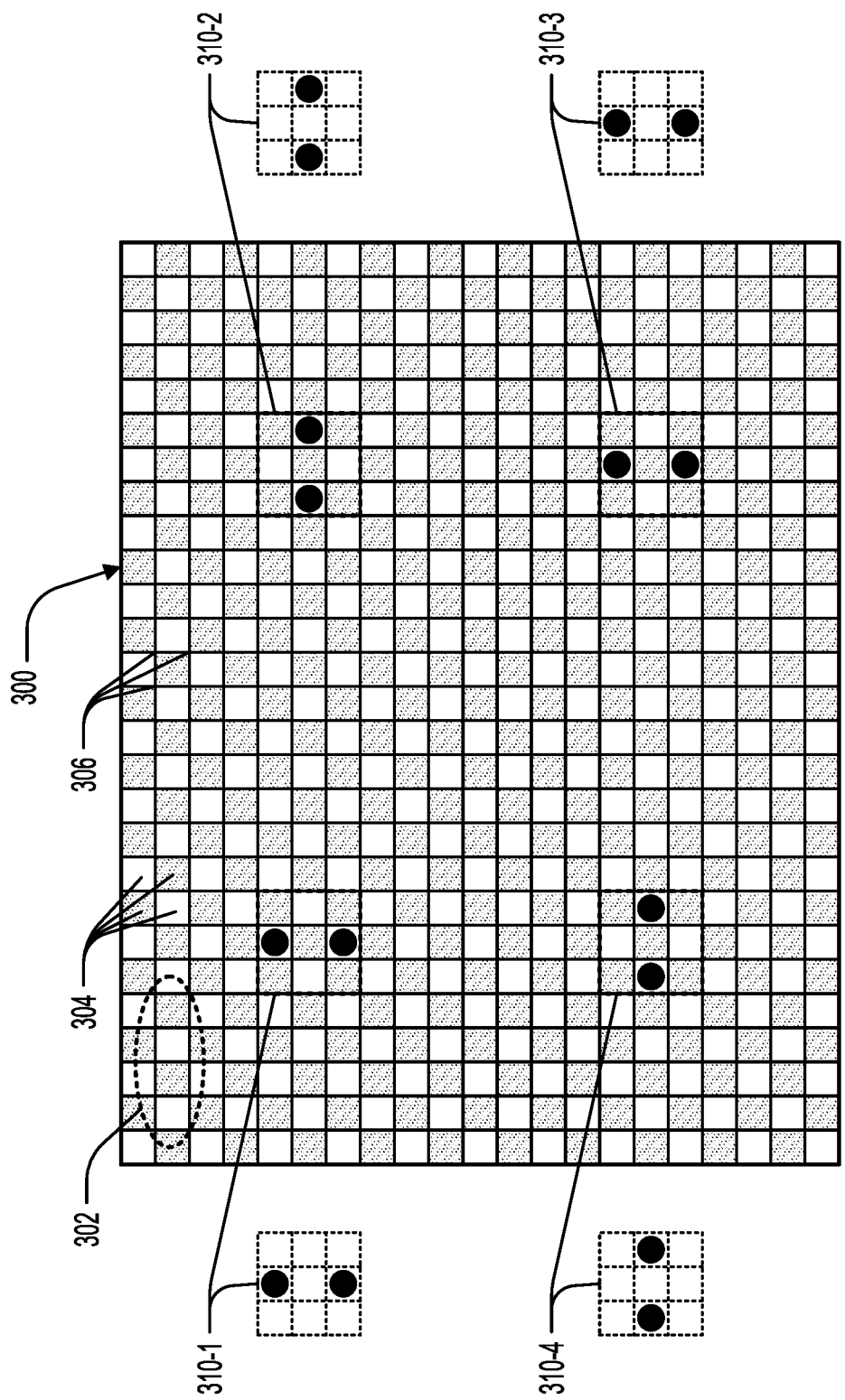
FIG. 3B illustrates an example implementation of a multi-pattern target.

FIG. 3B illustrates an example implementation of multi-pattern target 300, according to some embodiments of the present disclosure. In the illustrated example, tessellation 302 has a repeated structure of tiles 304 of square shape alternating between white and black. Corners and intersection points formed by tiles 304 are referred to as tile points 306. Patterns 310-1 and 310-3 each include two black circles that are separated vertically and are superimposed onto white tiles of tessellation 302. Patterns 310-2 and 310-4 each include two black circles that are separated horizontally and are also superimposed onto white tiles of tessellation 302.

Figure 4A:
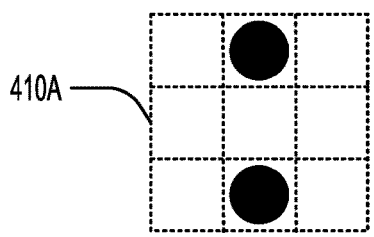
FIGS. 4A-4H illustrate various examples of patterns that may be included in a target.
Figure 4B:
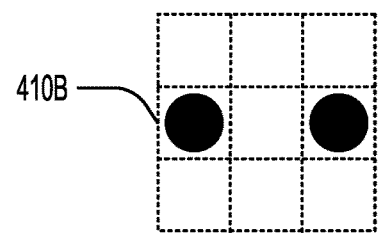
Figure 4C:
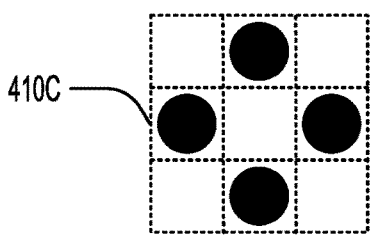
Figure 4D:
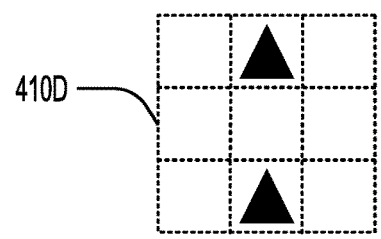
Figure 4E:
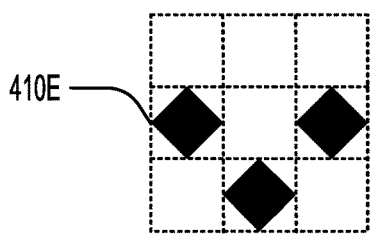
Figure 4F:
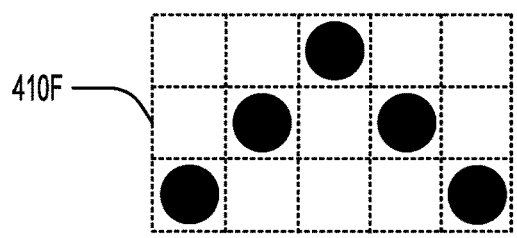
Figure 4G:
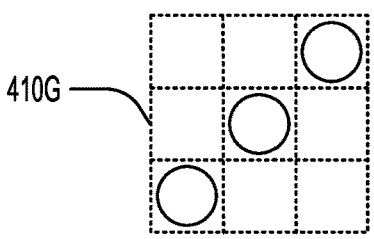
Figure 4H:
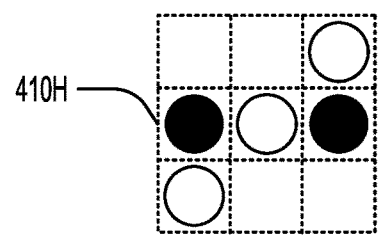

FIGS. 4A-4H illustrate various examples of patterns that may be included in a target, according to some embodiments of the present disclosure. FIG. 4A illustrates a pattern 410A that includes two black circles that are separated vertically. FIG. 4B illustrates a pattern 410B that includes two black circles that are separated horizontally. FIG. 4C illustrates a pattern 410C that includes four black circles that are arranged in a diamond. FIG. 4D illustrates a pattern 410D that includes two black triangles that are separated vertically. FIG. 4E illustrates a pattern 410E that includes three black diamonds that are separated horizontally and vertically. FIG. 4F illustrates a pattern 410F that includes five black circles that are separated horizontally and vertically over a larger area than the other patterns. FIG. 4G illustrates a pattern 410G that includes three white circles that are arranged along a diagonal. FIG. 4H illustrates a pattern 410H that includes two black circles that are separated horizontally and three white circles that are arranged along a diagonal.

Figure 5:
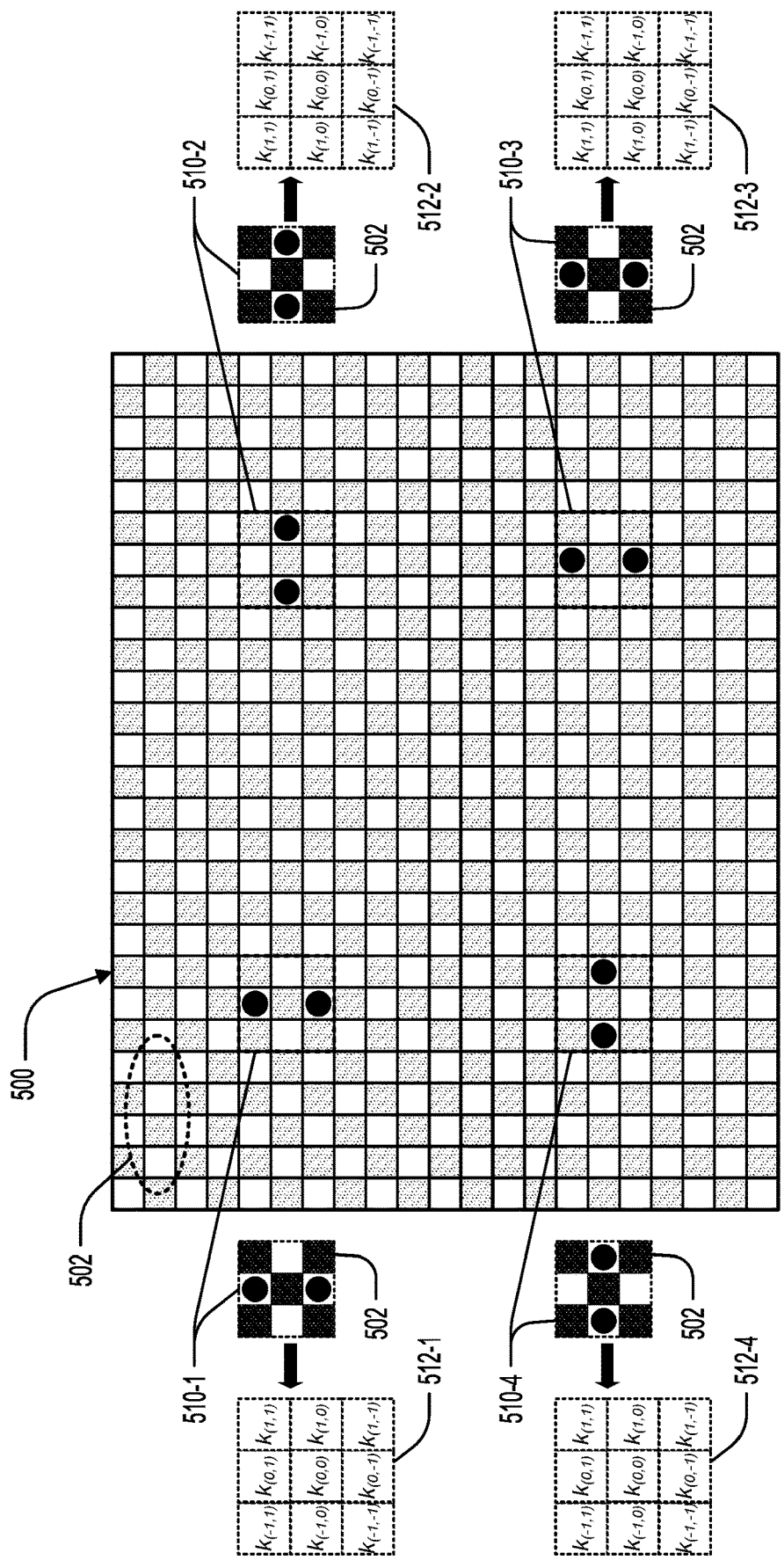
FIG. 5 illustrates examples of kernels that may be generated for a multi-pattern target.

FIG. 5 illustrates examples of kernels 512 that may be generated for a multi-pattern target 500, according to some embodiments of the present disclosure. In the illustrated example, tessellation 502 and patterns 510 may be similar to those described previously. In some embodiments, kernels 512 may be generated for patterns 510 based on the corresponding pattern being superimposed onto tessellation 502. For example, the average intensity of each tile (with the corresponding pattern superimposed) may be calculated and used to calculate the values of the kernel. For pattern 510-1 superimposed onto tessellation 502, the average intensity of black tiles is low, the average intensity of white tiles is high, and the average intensity of white tiles with black circles superimposed onto them is a medium value between the all black and all white tiles. The average intensities for the tiles may incorporate expected lighting and other image effects. For example, tiles near the edge of multi-pattern target 500 may be expected to be darker for certain displays than tiles near the center.

Figure 6:
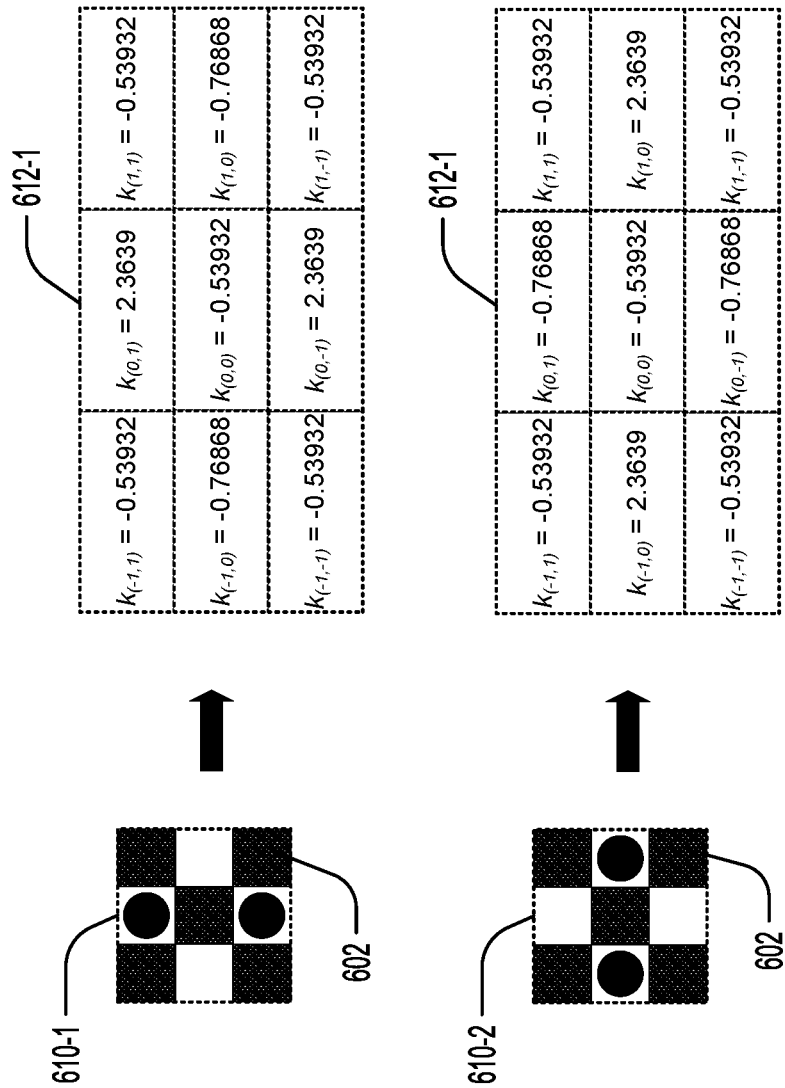
FIG. 6 illustrates an example calculation of two kernels.

FIG. 6 illustrates an example calculation of two kernels 612, according to some embodiments of the present disclosure. In the illustrated example, tessellation 602, patterns 610, and kernels 612 may be similar to those described previously. Kernels 612 have been optimized for locating patterns 610 within a target. As shown, kernel values do not necessarily correlate with the magnitude of tiles. For example, white tiles do not necessarily correspond to large values in the corresponding kernel, and likewise black tiles do not necessarily correspond to small values.

In some embodiments, the optimization procedure aims to find a kernel that produces the largest difference in magnitude between values in the convolution that are not from the tessellation overlaid with the pattern and the single value that is, thereby allowing the pattern location to be easily distinguished. A large set of images may be used for the optimization procedure, with the intent that application-specific contrast and pattern circle size may be accounted for, resulting in a kernel that is highly efficient at distinguishing the unique pattern in conditions similar to the test images. While a kernel that is not optimized can still yield good results, the optimized kernel can be very efficient when dealing with poor lighting conditions or displays that have a high degree of intensity roll off.

Figure 7:
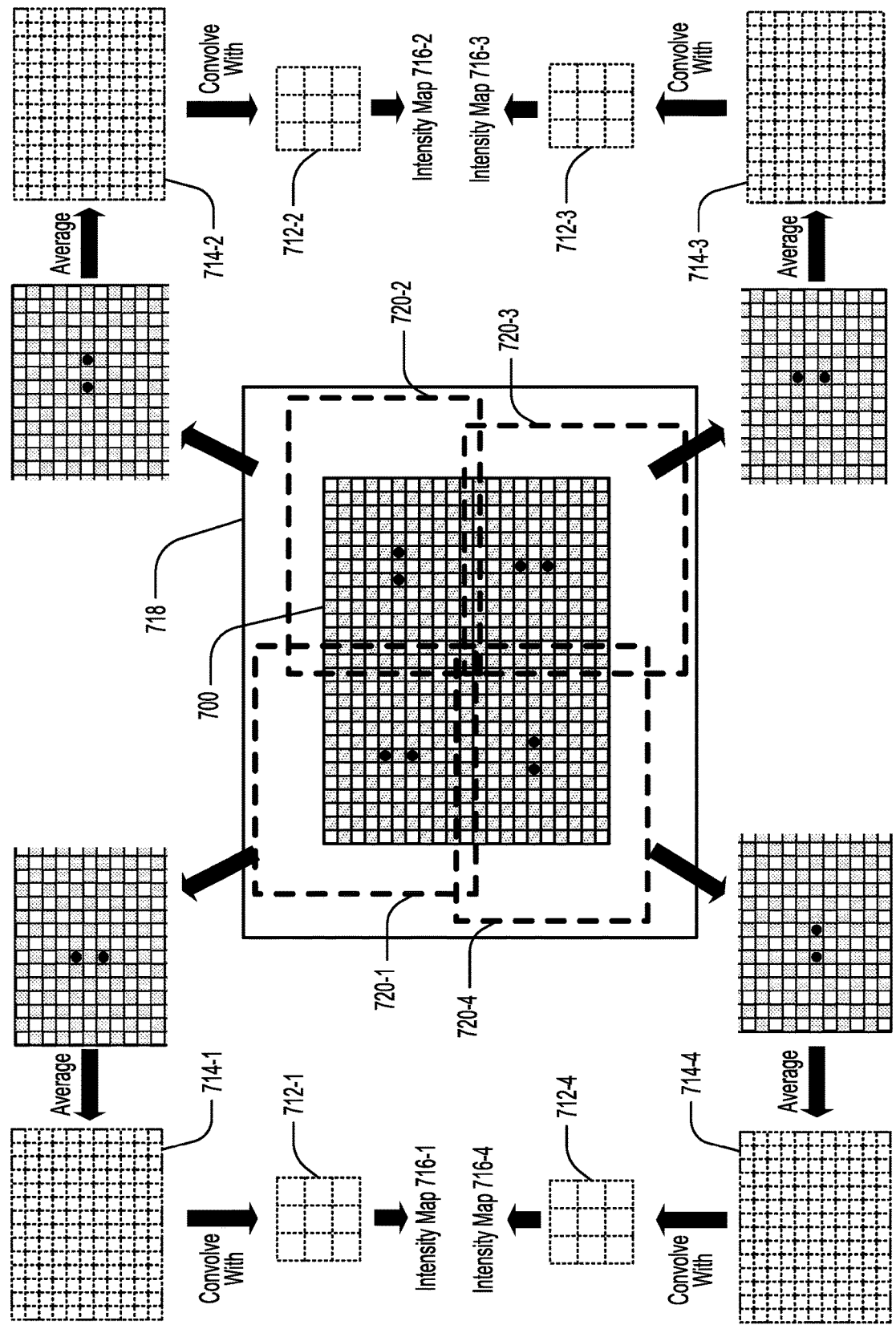
FIG. 7 illustrates various example steps for calibrating a device based on an image of a multi-pattern target.

FIG. 7 illustrates various example steps for calibrating a device based on an image 718 of a multi-pattern target 700, according to some embodiments of the present disclosure. In the illustrated example, multi-pattern target 700 and kernels 712 may be similar to those described previously. Image 718 may be captured by a camera that is directed at multi-pattern target 700. Image 718 may then be divided into multiple image regions 720. Each image region 720 may cover a portion of image 718 and/or multi-pattern target 700, and different image regions 720 may partially spatially overlap with each other. In some instances, image regions 720 may overlap to ensure that a particular pattern is contained within each image region 720.

Matrices 714 are formed for image regions 720 based on the pixel intensities of image 718. For each image region 720, tiles are identified and pixel intensities within each of the identified tiles are used to compute each value of a matrix 714. In some embodiments, the average pixel intensity is used for each value of the matrix. In some embodiments, other metrics such as maximum pixel intensity or minimum pixel intensity may also be used for each value of the matrix.

Each matrix 714 is convolved with a kernel 712 for the pattern that is expected to be found within the corresponding image region 720. For example, matrix 714-1 is convolved with kernel 712-1 since kernel 712-1 was generated for the pattern expected to be found in image region 720-1 (the top left of image 718). As another example, matrix 714-2 is convolved with kernel 712-2 since kernel 712-2 was generated for the pattern expected to be found in image region 720-2 (the top right of image 718). The results of convolving matrices 714 with kernels 712 are intensity maps 716, which may also be matrices and may have similar dimensions to matrices 714. An extrema value (e.g., maximum value or minimum value) is identified within each of intensity maps 716. The extrema values allow the patterns to be located within image 718.

Figure 8:
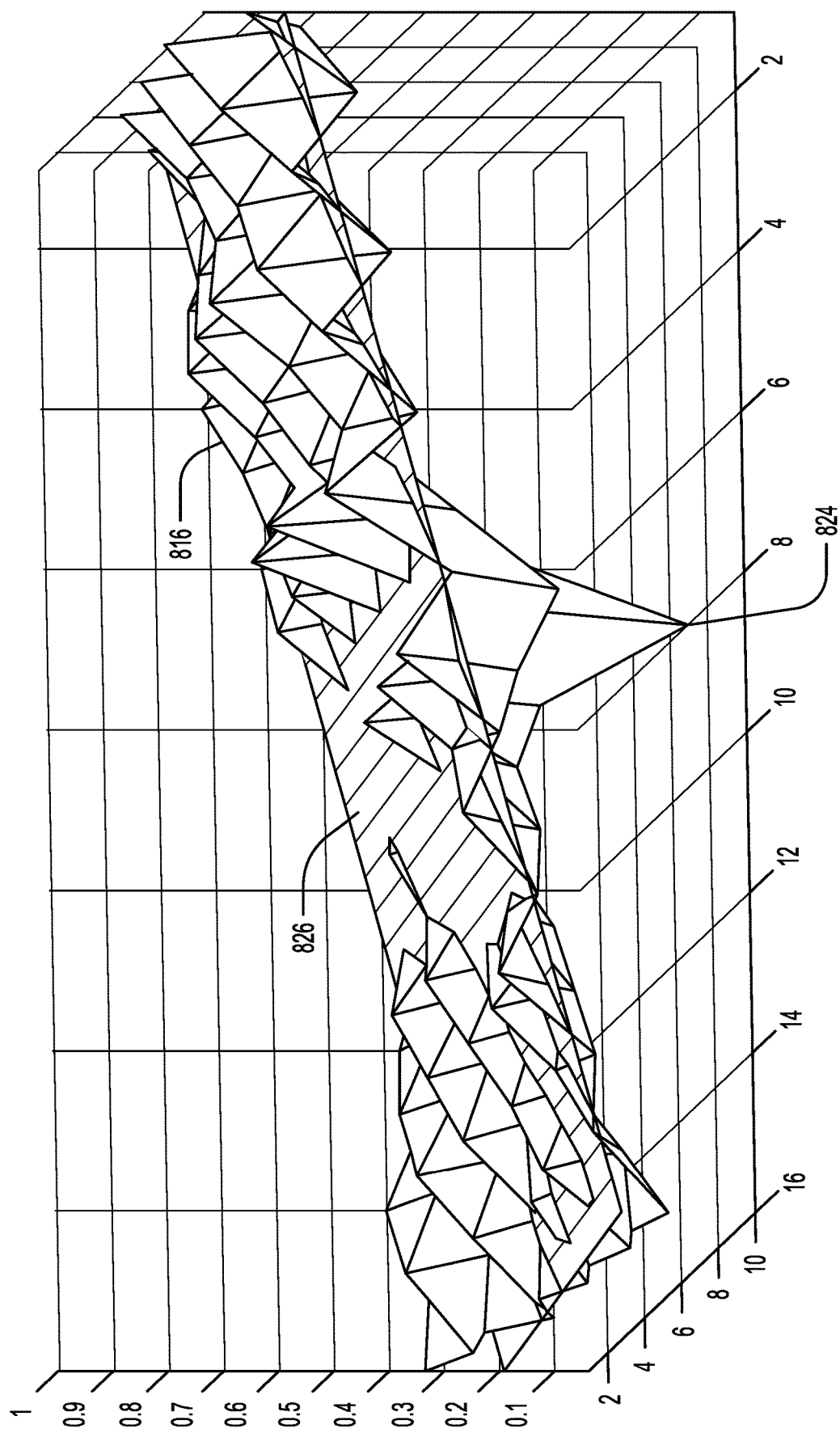
FIG. 8 illustrates an example of an intensity map.

FIG. 8 illustrates an example of an intensity map 816, according to some embodiments of the present disclosure. In some embodiments, an extrema value 824 (e.g., minimum value) is identified in intensity map 816 by determining a maximum or minimum value. In some embodiments, in order to account for image effects in the captured image, such as a variation in lighting across the image, a surface 826 may be fitted to intensity map 816. Surface 826 may be a flat planar surface or a curved surface. While a planar surface can account for variation in a one-dimensional (1D) direction, a curved surface can account for different variations in different directions. Once fitted surface 826 is obtained, extrema value 824 may be identified in reference to fitted surface 826 (e.g., the further distance from surface 826 on a particular side of surface 826).

Figure 9:
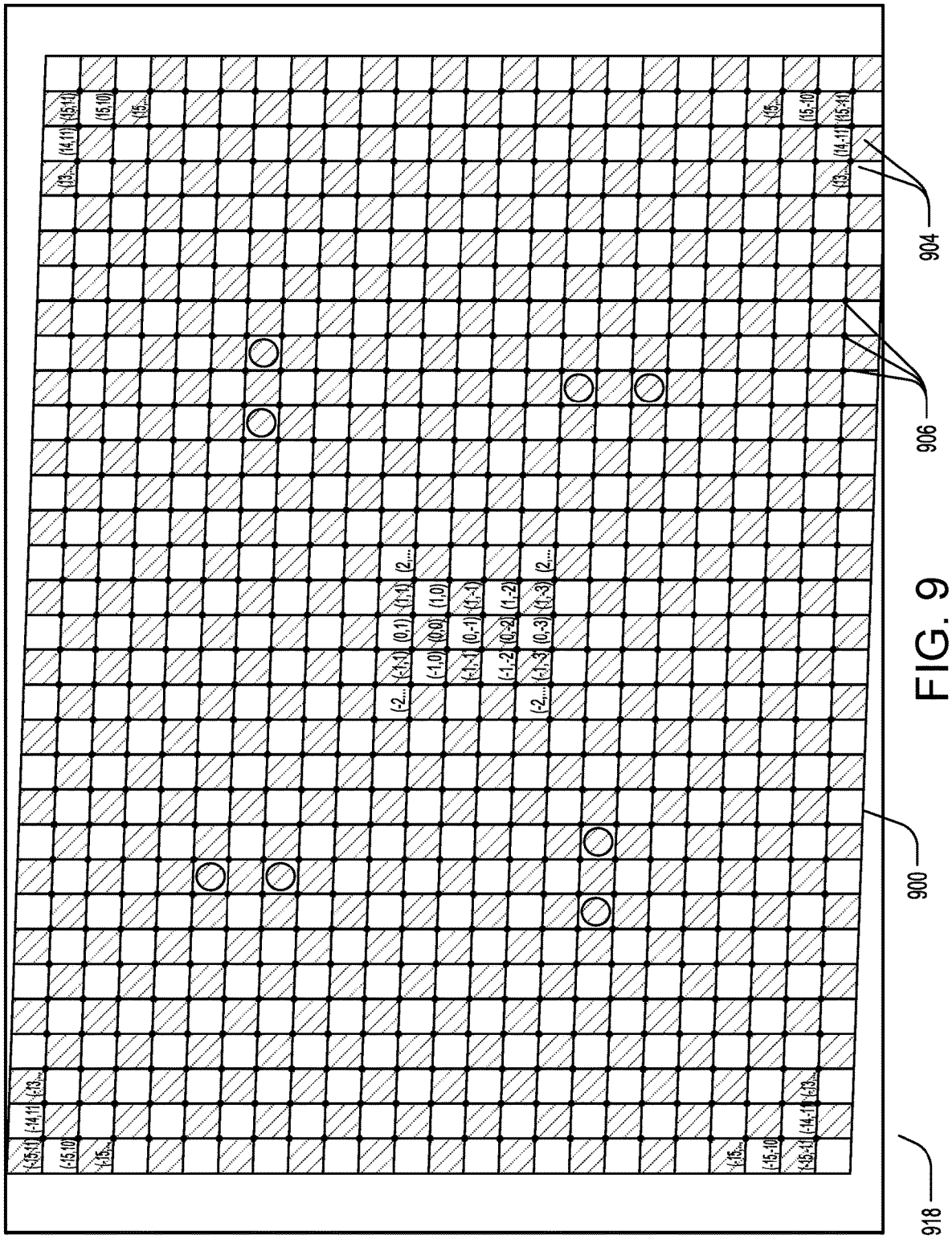
FIG. 9 illustrates an example of an image containing a multi-pattern target.

FIG. 9 illustrates an example of an image 918 containing a multi-pattern target 900, according to some embodiments of the present disclosure. In the illustrated example, multi-pattern target 900, tiles 904, tile points 906, and image 918 may be similar to those described previously. Once the locations of the patterns within image 918 have been determined, tile points 906 may be registered within image 918 and be used to calibrate either the camera that captured image 918 or the display that rendered multi-pattern target 900. For example, the pose of the camera with respect to multi-pattern target 900 may be estimated and the spacing between tile points 906 may be verified based on the pose of the camera. In some instances, once the pose of the camera is estimated, an expected spacing between tile points 906 may be computed and compared to a detected spacing between tile points 906. Where the difference between the expected and detected spacings is large, the parameters of the camera and/or display may be adjusted to improve the consistency between the two.

Figure 10:
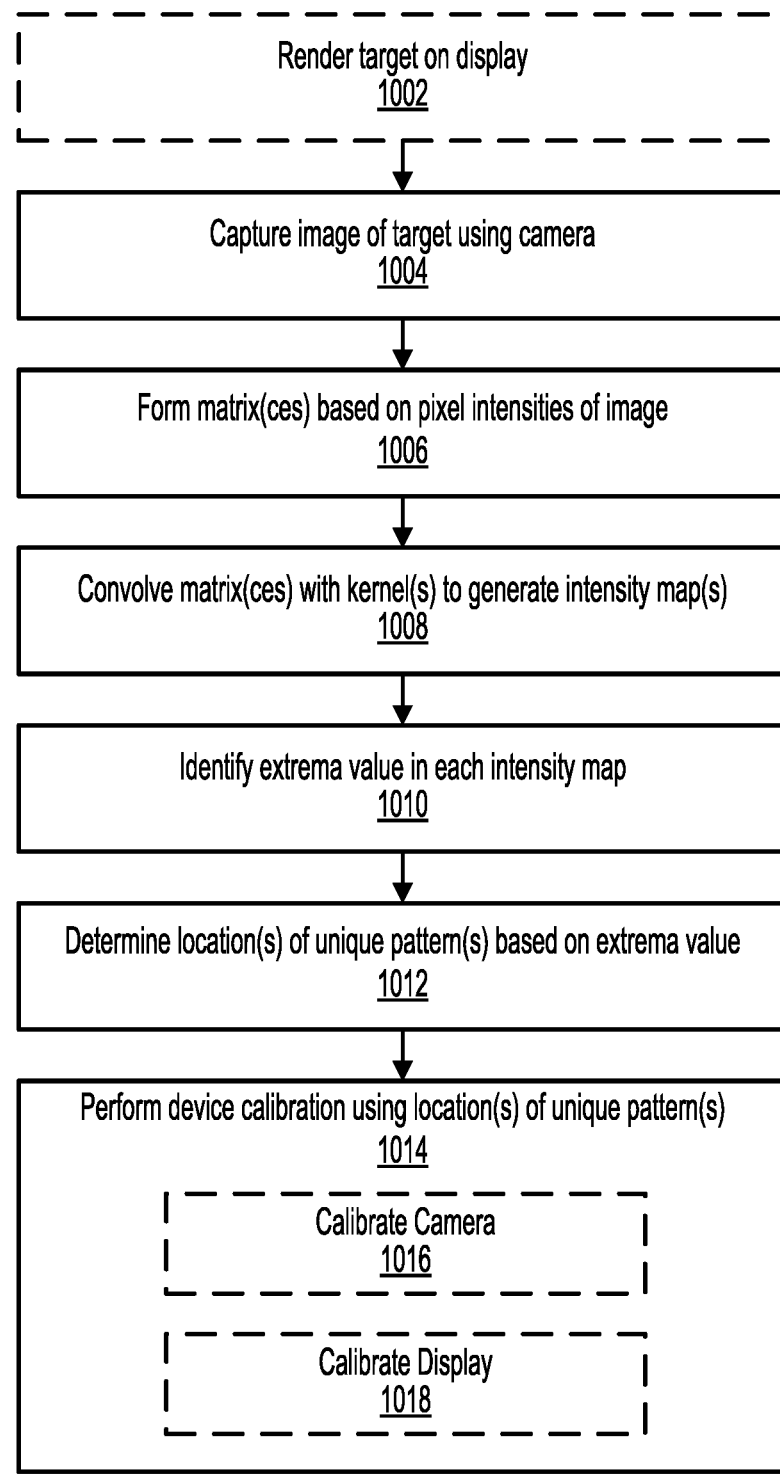
FIG. 10 illustrates a method of performing a device calibration.

FIG. 10 illustrates a method 1000 of performing a device calibration, according to some embodiments of the present disclosure. One or more steps of method 1000 may be omitted during performance of method 1000, and one or more steps of method 1000 need not be performed in the order shown. Method 1000 may be implemented as a computer-readable medium or computer program product comprising instructions which, when the program is executed by one or more computers, cause the one or more computers to carry out the steps of method 1000. Such computer program products can be transmitted, over a wired or wireless network, in a data carrier signal carrying the computer program product.

At step 1002, a target (e.g., targets 106, 110, 300, 500, 700, 900) is rendered on a display (e.g., display 112). The display may be an optical see through (OST) head-mounted display (HMD) having waveguides configured to project light toward a user side of the device so that the target is perceived.

At step 1004, an image (e.g., images 718, 918) of the target is captured using a camera (e.g., cameras 104, 108). The image may include multiple pixel intensities. The target may include a tessellation (e.g., tessellations 302, 502, 602). The tessellation may have a repeated structure of tiles (e.g., tiles 304, 904). The target may include one or more unique patterns (e.g., patterns 310, 410, 510, 610) that are superimposed onto the tessellation. In some embodiments, the image may be divided into a plurality of image regions (e.g., image regions 720). Two or more of the plurality of image regions may overlap with each other. In some embodiments, dividing the image may include partitioning the image into a plurality of non-overlapping image regions. In some embodiments, the plurality of image regions may be processed simultaneously using multiple processors or processor cores.

At step 1006, one or more matrices (e.g., matrices 714) are formed based on the pixel intensities of the image. Each of the one or more matrices may include a plurality of values. Each of the plurality of values may correspond to the pixel intensities within one of the tiles as captured in the image. For example, each of the plurality of values may be calculated by averaging the pixel intensities within one of the tiles. In another example, each of the plurality of values may be calculated by determining the maximum or minimum pixel intensity within one of the tiles.

At step 1008, the one or more matrices are convolved with one or more kernels (e.g., kernels 512, 612, 712). Convolving the one or more matrices with the one or more kernels may generate one or more intensity maps (e.g., intensity maps 716, 816). Each of the one or more kernels may be generated based on a corresponding unique pattern of the one or more unique patterns. For example, each of the one or more kernels may be generated based on the detected or expected pixel intensities of the corresponding unique pattern being superimposed onto the tessellation.

At step 1010, an extrema value (e.g., extrema value 824) is identified in each of the one or more intensity maps. The extrema value may be a maximum value or a minimum value. The extrema value may be identified in reference to a surface (e.g., surface 826) that is fitted to an intensity map of the one or more intensity maps.

At step 1012, a location of each of the one or more unique patterns within the image is determined based on the extrema value for each of the one or more intensity maps. The location of each of the one or more unique patterns may be used to register (e.g., locate) tile points (e.g., tile points 306, 906) within the image, which are used for the device calibration.

At step 1014, the device calibration is performed. The device calibration may be performed using the location of each of the one or more unique patterns (and/or using the registered tile points). Step 1014 may include one or both of steps 1016 and 1018. At step 1016, the camera is calibrated using the location of each of the one or more unique patterns (and/or using the registered tile points). Calibrating the camera may include mapping a real-world coordinate system using the registered tile points. At step 1018, the display is calibrated using the location of each of the one or more unique patterns (and/or using the registered tile points). Calibrating the display may include mapping a real-world coordinate system using the registered tile points. In some instances, prior to performing step 1018, the camera used to capture the image at step 1004 has previously been calibrated by mapping the real-world coordinate system.

Figure 11:
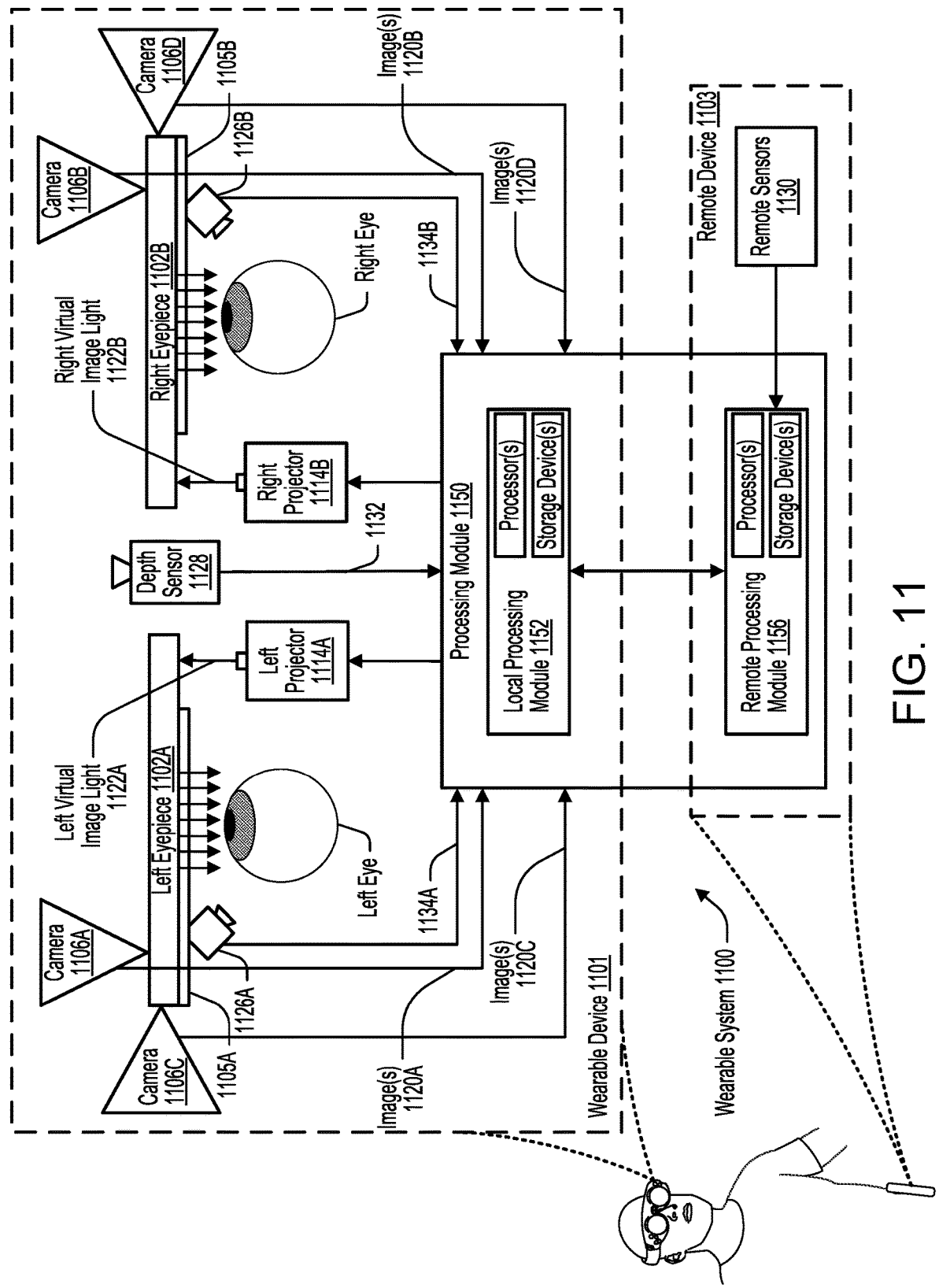
FIG. 11 illustrates a schematic view of an example wearable system.

FIG. 11 illustrates a schematic view of an example wearable system 1100 that may be used in one or more of the above-described embodiments, according to some embodiments of the present disclosure. Wearable system 1100 may include a wearable device 1101 and at least one remote device 1103 that is remote from wearable device 1101 (e.g., separate hardware but communicatively coupled). While wearable device 1101 is worn by a user (generally as a headset), remote device 1103 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 1101 may include a left eyepiece 1102A and a left lens assembly 1105A arranged in a side-by-side configuration and constituting a left optical stack. Left lens assembly 1105A may include an accommodating lens on the user side of the left optical stack as well as a compensating lens on the world side of the left optical stack. Similarly, wearable device 1101 may include a right eyepiece 1102B and a right lens assembly 1105B arranged in a side-by-side configuration and constituting a right optical stack. Right lens assembly 1105B may include an accommodating lens on the user side of the right optical stack as well as a compensating lens on the world side of the right optical stack.

In some embodiments, wearable device 1101 includes one or more sensors including, but not limited to: a left front-facing world camera 1106A attached directly to or near left eyepiece 1102A, a right front-facing world camera 1106B attached directly to or near right eyepiece 1102B, a left side-facing world camera 1106C attached directly to or near left eyepiece 1102A, a right side-facing world camera 1106D attached directly to or near right eyepiece 1102B, a left eye tracking camera 1126A directed toward the left eye, a right eye tracking camera 1126B directed toward the right eye, and a depth sensor 1128 attached between eyepieces 1102. Wearable device 1101 may include one or more image projection devices such as a left projector 1114A optically linked to left eyepiece 1102A and a right projector 1114B optically linked to right eyepiece 1102B.

Wearable system 1100 may include a processing module 1150 for collecting, processing, and/or controlling data within the system. Components of processing module 1150 may be distributed between wearable device 1101 and remote device 1103. For example, processing module 1150 may include a local processing module 1152 on the wearable portion of wearable system 1100 and a remote processing module 1156 physically separate from and communicatively linked to local processing module 1152. Each of local processing module 1152 and remote processing module 1156 may include one or more processing units (e.g., central processing units (CPUs), graphics processing units (GPUs), etc.) and one or more storage devices, such as non-volatile memory (e.g., flash memory).

Processing module 1150 may collect the data captured by various sensors of wearable system 1100, such as cameras 1106, eye tracking cameras 1126, depth sensor 1128, remote sensors 1130, ambient light sensors, microphones, inertial measurement units (IMUs), accelerometers, compasses, Global Navigation Satellite System (GNSS) units, radio devices, and/or gyroscopes. For example, processing module 1150 may receive image(s) 1120 from cameras 1106. Specifically, processing module 1150 may receive left front image(s) 1120A from left front-facing world camera 1106A, right front image(s) 1120B from right front-facing world camera 1106B, left side image(s) 1120C from left side-facing world camera 1106C, and right side image(s) 1120D from right side-facing world camera 1106D. In some embodiments, image(s) 1120 may include a single image, a pair of images, a video comprising a stream of images, a video comprising a stream of paired images, and the like. Image(s) 1120 may be periodically generated and sent to processing module 1150 while wearable system 1100 is powered on, or may be generated in response to an instruction sent by processing module 1150 to one or more of the cameras.

Cameras 1106 may be configured in various positions and orientations along the outer surface of wearable device 1101 so as to capture images of the user's surrounding. In some instances, cameras 1106A, 1106B may be positioned to capture images that substantially overlap with the FOVs of a user's left and right eyes, respectively. Accordingly, placement of cameras 1106 may be near a user's eyes but not so near as to obscure the user's FOV. Alternatively or additionally, cameras 1106A, 1106B may be positioned so as to align with the incoupling locations of virtual image light 1122A, 1122B, respectively. Cameras 1106C, 1106D may be positioned to capture images to the side of a user, e.g., in a user's peripheral vision or outside the user's peripheral vision. Image(s) 1120C, 1120D captured using cameras 1106C, 1106D need not necessarily overlap with image(s) 1120A, 1120B captured using cameras 1106A, 1106B.

In some embodiments, processing module 1150 may receive ambient light information from an ambient light sensor. The ambient light information may indicate a brightness value or a range of spatially-resolved brightness values. Depth sensor 1128 may capture a depth image 1132 in a front-facing direction of wearable device 1101. Each value of depth image 1132 may correspond to a distance between depth sensor 1128 and the nearest detected object in a particular direction. As another example, processing module 1150 may receive eye tracking data 1134 from eye tracking cameras 1126, which may include images of the left and right eyes. As another example, processing module 1150 may receive projected image brightness values from one or both of projectors 1114. Remote sensors 1130 located within remote device 1103 may include any of the above-described sensors with similar functionality.

Virtual content is delivered to the user of wearable system 1100 using projectors 1114 and eyepieces 1102, along with other components in the optical stacks. For instance, eyepieces 1102A, 1102B may comprise transparent or semi-transparent waveguides configured to direct and outcouple light generated by projectors 1114A, 1114B, respectively. Specifically, processing module 1150 may cause left projector 1114A to output left virtual image light 1122A onto left eyepiece 1102A, and may cause right projector 1114B to output right virtual image light 1122B onto right eyepiece 1102B. In some embodiments, projectors 1114 may include micro-electromechanical system (MEMS) spatial light modulator (SLM) scanning devices. In some embodiments, each of eyepieces 1102A, 1102B may comprise a plurality of waveguides corresponding to different colors. In some embodiments, lens assemblies 1105A, 1105B may be coupled to and/or integrated with eyepieces 1102A, 1102B. For example, lens assemblies 1105A, 1105B may be incorporated into a multi-layer eyepiece and may form one or more layers that make up one of eyepieces 1102A, 1102B.

Figure 12:
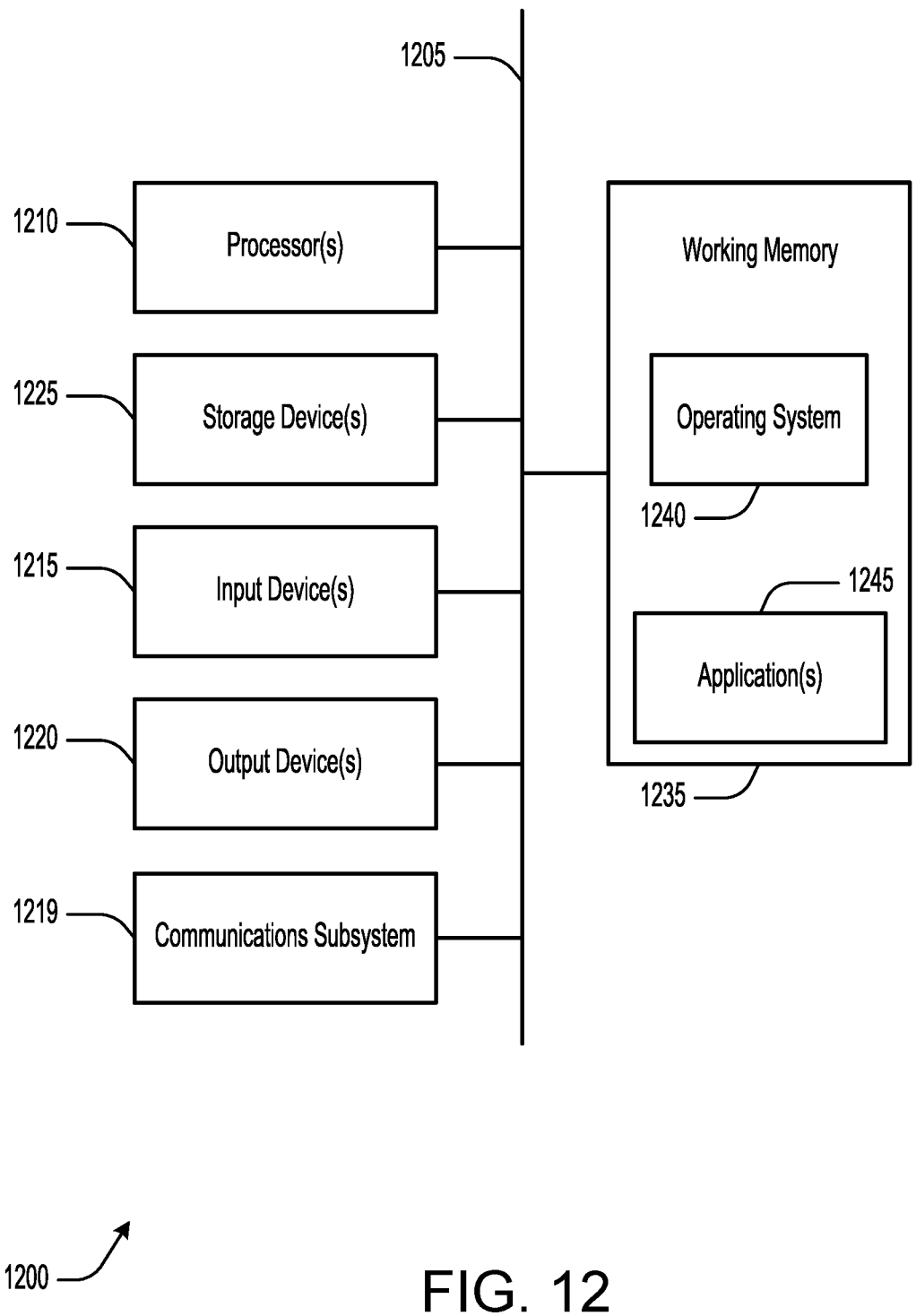
FIG. 12 illustrates a simplified computer system.

FIG. 12 illustrates a simplified computer system 1200 according to an embodiment described herein. Computer system 1200 as illustrated in FIG. 12 may be incorporated into devices described herein. FIG. 12 provides a schematic illustration of one embodiment of computer system 1200 that can perform some or all of the steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

Computer system 1200 is shown comprising hardware elements that can be electrically coupled via a bus 1205, or may otherwise be in communication, as appropriate. The hardware elements may include one or more processors 1210, including without limitation one or more general-purpose processors and/or one or more special-purpose processors such as digital signal processing chips, graphics acceleration processors, and/or the like; one or more input devices 1215, which can include without limitation a mouse, a keyboard, a camera, and/or the like; and one or more output devices 1220, which can include without limitation a display device, a printer, and/or the like.

Computer system 1200 may further include and/or be in communication with one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1200 might also include a communications subsystem 1219, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1219 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1219. In other embodiments, a portable electronic device, e.g. the first electronic device, may be incorporated into computer system 1200, e.g., an electronic device as an input device 1215. In some embodiments, computer system 1200 will further comprise a working memory 1235, which can include a RAM or ROM device, as described above.

Computer system 1200 also can include software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1225 described above. In some cases, the storage medium might be incorporated within a computer system, such as computer system 1200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1200 and/or might take the form of source and/or installable code, which, upon compilation and/or installation on computer system 1200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1200 to perform methods in accordance with various embodiments of the technology. According to a set of embodiments, some or all of the procedures of such methods are performed by computer system 1200 in response to processor 1210 executing one or more sequences of one or more instructions, which might be incorporated into the operating system 1240 and/or other code, such as an application program 1245, contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1200.

The communications subsystem 1219 and/or components thereof generally will receive signals, and the bus 1205 then might carry the signals and/or the data, instructions, etc. carried by the signals to the working memory 1235, from which the processor(s) 1210 retrieves and executes the instructions. The instructions received by the working memory 1235 may optionally be stored on a non-transitory storage device 1225 either before or after execution by the processor(s) 1210.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for performing a device calibration, the method comprising:
    capturing an image of a target using a camera, the target including a tessellation having a repeated structure of tiles, the target further including one or more unique patterns superimposed onto the tessellation;
    forming one or more matrices based on pixel intensities of the image, wherein each of the one or more matrices includes a plurality of values each corresponding to the pixel intensities within one of the tiles;
    convolving the one or more matrices with one or more kernels to generate one or more intensity maps, wherein each of the one or more kernels is generated based on a corresponding unique pattern of the one or more unique patterns being superimposed onto the tessellation;
    identifying an extrema value in each of the one or more intensity maps;
    determining a location of each of the one or more unique patterns within the image based on the extrema value for each of the one or more intensity maps; and
    performing the device calibration using the location of each of the one or more unique patterns.

2. The method of claim 1, wherein performing the device calibration includes:
    calibrating the camera using the location of each of the one or more unique patterns.

3. The method of claim 1, further comprising:
    rendering the target on a display.

4. The method of claim 3, wherein performing the device calibration includes:
    calibrating the display using the location of each of the one or more unique patterns.

5. The method of claim 1, further comprising:
    dividing the image into a plurality of image regions, wherein a matrix of the one or more matrices is formed for each of the plurality of image regions.

6. The method of claim 1, wherein forming the one or more matrices includes:
    for each of the one or more matrices, calculating each of the plurality of values by averaging the pixel intensities within a corresponding tile of the tiles.

7. A non-transitory computer-readable medium comprising instructions that, when executed by one or more processors, cause the one or more processors to perform operations comprising:
    capturing an image of a target using a camera, the target including a tessellation having a repeated structure of tiles, the target further including one or more unique patterns superimposed onto the tessellation;
    forming one or more matrices based on pixel intensities of the image, wherein each of the one or more matrices includes a plurality of values each corresponding to the pixel intensities within one of the tiles;
    convolving the one or more matrices with one or more kernels to generate one or more intensity maps, wherein each of the one or more kernels is generated based on a corresponding unique pattern of the one or more unique patterns being superimposed onto the tessellation;

identifying an extrema value in each of the one or more intensity maps;

determining a location of each of the one or more unique patterns within the image based on the extrema value for each of the one or more intensity maps; and performing a device calibration using the location of each of the one or more unique patterns.

8. The non-transitory computer-readable medium of claim 7, wherein performing the device calibration includes:
calibrating the camera using the location of each of the one or more unique patterns.

9. The non-transitory computer-readable medium of claim 7, wherein the operations further comprise:
rendering the target on a display.

10. The non-transitory computer-readable medium of claim 9, wherein performing the device calibration includes:
calibrating the display using the location of each of the one or more unique patterns.

11. The non-transitory computer-readable medium of claim 7, wherein the operations further comprise:
dividing the image into a plurality of image regions, wherein a matrix of the one or more matrices is formed for each of the plurality of image regions.

12. The non-transitory computer-readable medium of claim 7, wherein forming the one or more matrices includes:
for each of the one or more matrices, calculating each of the plurality of values by averaging the pixel intensities within a corresponding tile of the tiles.

13. A system comprising:
one or more processors; and
a non-transitory computer-readable medium comprising instructions that, when executed by the one or more processors, cause the one or more processors to perform operations comprising:
capturing an image of a target using a camera, the target including a tessellation having a repeated structure of tiles, the target further including one or more unique patterns superimposed onto the tessellation;

forming one or more matrices based on pixel intensities of the image, wherein each of the one or more matrices includes a plurality of values each corresponding to the pixel intensities within one of the tiles;

convolving the one or more matrices with one or more kernels to generate one or more intensity maps, wherein each of the one or more kernels is generated based on a corresponding unique pattern of the one or more unique patterns being superimposed onto the tessellation;

identifying an extrema value in each of the one or more intensity maps;

determining a location of each of the one or more unique patterns within the image based on the extrema value for each of the one or more intensity maps; and performing a device calibration using the location of each of the one or more unique patterns.

14. The system of claim 13, wherein performing the device calibration includes:
calibrating the camera using the location of each of the one or more unique patterns.

15. The system of claim 13, wherein the operations further comprise:
rendering the target on a display.

16. The system of claim 15, wherein performing the device calibration includes:
calibrating the display using the location of each of the one or more unique patterns.

17. The system of claim 13, wherein the operations further comprise:
dividing the image into a plurality of image regions, wherein a matrix of the one or more matrices is formed for each of the plurality of image regions.

18. The system of claim 13, wherein forming the one or more matrices includes:
for each of the one or more matrices, calculating each of the plurality of values by averaging the pixel intensities within a corresponding tile of the tiles.

\* \* \* \* \*